Sept. 17, 1940.   E. A. WERT   2,215,238
ANCHORAGE FOR PIPE LINES AND THE LIKE
Filed Feb. 11, 1938
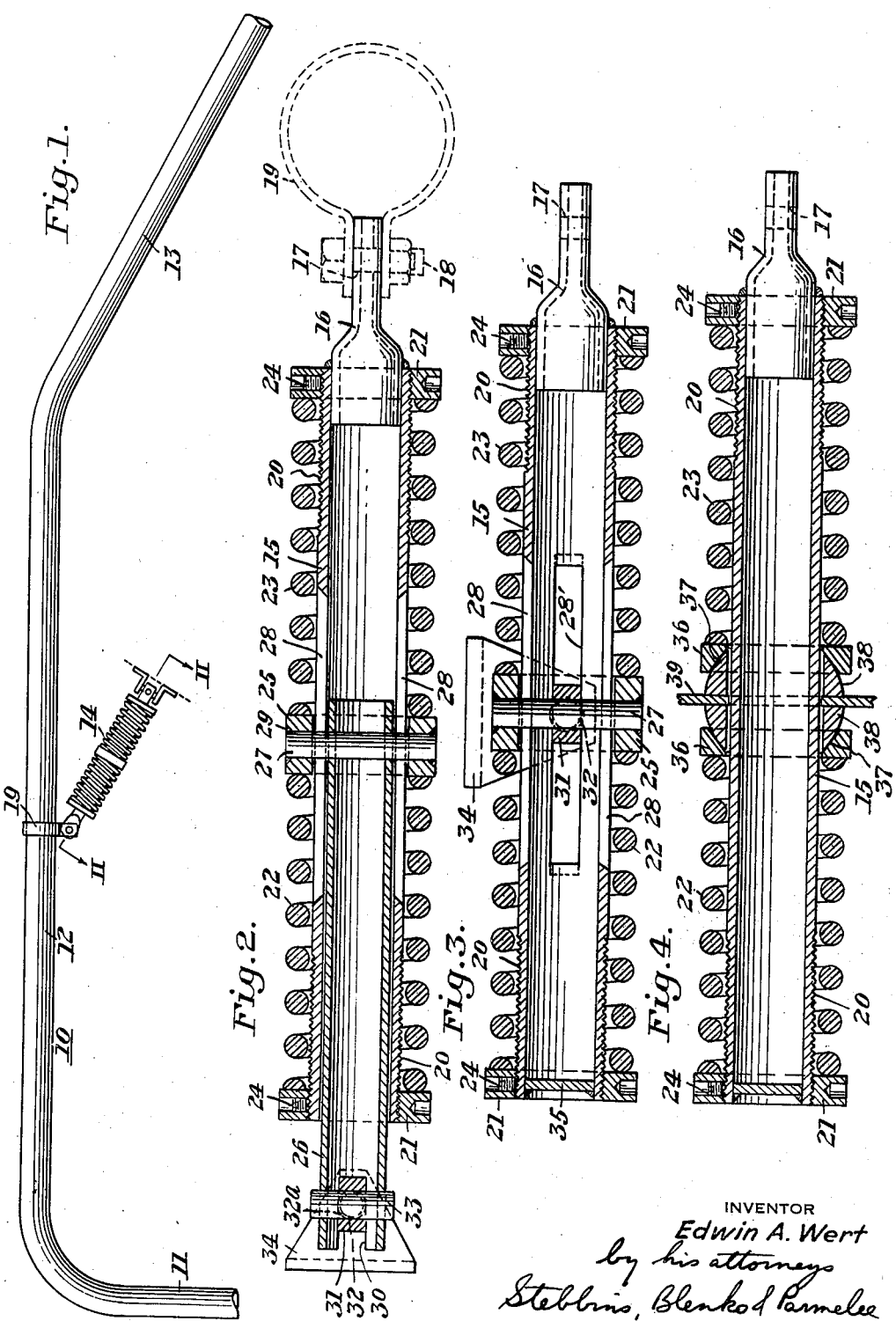
INVENTOR
Edwin A. Wert
by his attorneys
Stebbins, Blenko & Parmelee

UNITED STATES PATENT OFFICE 2,215,238

ANCHORAGE FOR PIPE LINES AND THE LIKE

Edwin A. Wert, Detroit, Mich., assignor to Blaw-Knox Company, Pittsburgh, Pa., a corporation of New Jersey Application February 11, 1938, Serial No. 190,048

3 Claims. (Cl. 248—54)

It has been found that pipe line installations including relatively long horizontal runs, such as those employed for distributing steam in a power plant, are subject to a considerable amount of shock and vibration resulting from the passage of steam through the pipe, variations in the rate of flow, or to mechanical oscillation. These shocks and vibrations are apt to be transmitted throughout the length of the line and may cause excessive vibration of portions having a natural vibration frequency close to that of the transmitted vibration. Naturally, such excessive vibration is highly objectionable because of the considerable strain imposed thereby on pipe connections, supports, etc.; and it is the object of this invention to provide a simple yet effective means for limiting these vibrations to such an extent that no harmful results will flow therefrom.

In accordance with the invention, I provide a resilient anchorage adapted to have one end rigidly secured to the pipe line, the vibration of which it is desired to check, the other end being secured to a relatively fixed support. The anchorage includes shock-absorption means which may be adjusted to exert the desired degree of force in opposition to any vibrations that might be applied to the line. Briefly, the invention comprises an elongated member or guide tube having coil spring sections disposed thereon and compressed between abutments, preferably in the form of adjusting nuts adjacent the ends of the tube. One end of the tube is adapted to be secured to the pipe line. Means are provided intermediate the spring sections for cooperating with a fixed support. The following detailed description, referring to the accompanying drawing illustrating several embodiments of the invention, will make clear the construction and operation thereof. In the drawing:

Figure 1 is a partial plan view showing a portion of a pipe line installation with the invention applied thereto;

Figure 2 is a sectional view taken on the line II—II of Figure 1;

Figure 3 is a view similar to Figure 2 showing a modified form of the invention; and Figure 4 is a similar view showing a still further modification.

Referring in detail to the drawing, a portion of a pipe line installation shown at 10 has sections 11, 12, and 13 angularly disposed relative to each other. The various portions of the pipe line are supported by hangers of any suitable type. The suspension hangers usually employed have little or no effect in restraining longitudinal or transverse vibration of the pipe line, but this function is effectively performed by the anchorage of my invention, which is indicated generally at 14. As illustrated in Figure 1, the anchorage comprises principally an elongated member or tube 15, having a terminal 16 welded into one end thereof. The terminal is provided with an eye 17 adapted to receive a bolt 18 associated with a pipe clamp 19.

The ends of the tube 15 are threaded as at 20, for the reception of adjusting nuts 21. The nuts 21 provide abutments adjacent the ends of the tube 15 between which coil spring sections 22 and 23 may be compressed. The nuts 21 may be secured in adjusted positions by set screws 24. An annular seating member or collar 25 is disposed on the tube 15 between the spring sections 22 and 23.

A thrust member 26 is telescoped within the tube 15 and is provided with a through pin 27. The pin 27 extends outwardly through slots 28, formed in the tube 15, and into radial holes in the member 25 to which the pin is welded, as at 29. The outer end of the thrust member 26 is slotted as at 30 to receive a block 31 having threaded studs 32 projecting from opposite ends thereof. A pin 33 passes through a central hole in the block and aligned holes in the thrust tube 26. Angle brackets 34 are bored to receive the studs 32 and bushings 32a disposed thereon, and may be held in place by nuts threaded on the studs. The angle brackets may be secured to a fixed support in any convenient manner as by bolting, riveting, or the like. The block 31 and pin 33 provide a universal connection between the tube 26 and brackets 34 whereby the latter may be disposed in almost any position as may be required by the support to which the brackets are to be secured.

As shown in Figure 1, the anchorage 14 is installed so as to lie generally along the length of the adjacent section of the pipe line. Because of this relation, any longitudinal or transverse vibration of the section 12 of the pipe line will cause alternate compression and relief of the spring sections 22 and 23. Because the seating member 25 is secured to a fixed support so as to prevent longitudinal motion, and any longitudinal or other vibration of the pipe line section is communicated directly to the guide tube 15, it will be evident that the alternate compression of the spring sections resulting from any incipient vibration will tend to damp such vibration promptly, and effectively prevent it from reaching a dangerous amplitude. The block 31 and pin 33 constitute a universal joint between the angle brackets 34 and the thrust tube 36, so the latter is subject to no force except axial thrust, being freely swingable about the intersection of the axes of the universal joint as may be required by movement of the tube 15.

Figure 3 illustrates a modification in which corresponding parts are designated by the same numerals as in Figure 1. The form of the invention shown in Figure 3 is distinguished by the fact that the tube 15 is provided with slots 28' spaced intermediate the slots 28 circumferentially of the tube. The slots 28' are adapted to receive the block 31 and pin 27 passes through the hole in the block. The angle brackets 34 are secured to the threaded studs 32 on the block 31 in the manner already indicated. The end of the tube 15, remote from the terminal 16, is closed by a blank end 35 welded therein.

It will be apparent that the form of the invention shown in Figure 3 is adapted for use in cases where the fixed supporting member is positioned relatively close to the pipe line section to which the anchorage is secured. In principle and operation, however, the device of Figure 3 is similar to that of Figures 1 and 2.

The structure shown in Figure 4 is similar to that of Figure 3, except that the seating ring 25 is replaced by a pair of seating members 36, having spherical surfaces 37 and spacer members 38 having spherical exteriors adapted to engage the surfaces 37. The spacers 38 engage a relatively fixed member 39, disposed therebetween, which may, for example, be the web of a beam or column.

It will be recognized that all forms of the invention are capable of angular movement relative to the fixed support. The structure of Figure 3 incorporates a universal joint composed of the block 31 and the pin 27 similar to that connecting the brackets 34 to the thrust tube 26 of the anchorage shown in Figures 1 and 2. The device of Figure 4 incorporates a ball-and-socket joint provided by the seating members 36 and the spacers 38.

It will be apparent from the foregoing description and explanation that the invention provides a simple and effective means for checking and damping longitudinal or other vibrations that may be set up in pipe lines or the like. While the invention will usually be so installed as to check longitudinal vibrations principally, it is also simultaneously effective to damp any tendency to vibrate in other directions. The damping of longitudinal vibrations, furthermore, tends to prevent other types of vibrations from being set up. It will be seen that it is thus practically impossible for a pipe line having the invention applied thereto to vibrate at dangerous amplitudes by reason of the coincidence of the frequency of induced vibration with the natural frequency of various portions of the pipe line. It will also be understood that anchorages in accordance with the invention will be applied in such numbers and in such positions to any particular pipe line section as to achieve the desired result. The compression of the coil spring sections can be readily varied by adjusting the nuts 21 to obtain the desired initial resistance to longitudinal vibration of a section of pipe line. It will be observed that both the nuts 21 are capable of adjustment. It is possible, therefore, to adjust the device in such manner that no thrust is imposed on the pipe by the springs when there are no vibrations; or to impose some thrust by the springs in either direction, if that be desirable.

Although I have illustrated and described but a few embodiments of the invention, it will be understood that changes in the construction and arrangement shown may be made without departing from the spirit of the invention or the scope of the appended claims.

I claim:

1. The combination with a steam supply system including horizontal runs of pipe subjected to longitudinal vibration, of an anchorage adapted to be secured to one of said runs and to a fixed support, said anchorage comprising an elongated guide member connected either to the fixed support or to the pipe, a collar movable along the guide member and connected to the other of the pipe or fixed support, compression springs disposed on the guide member at each side and bearing against the collar, and adjustable nuts threaded at the two ends of the guide member for adjusting the initial compression of said springs individually whereby the anchorage may exert an initial thrust upon the pipe in either direction desired as well as a resistance against movement in both directions.

2. The combination with a steam supply system including horizontal runs of pipe subjected to longitudinal vibration, of an anchorage adapted to be secured to one of said runs and to a fixed support, said anchorage comprising an elongated tube and an articulated connection between the tube and either the fixed support or the pipe, a collar movable along the tube and an articulated connection between the collar and the other of the pipe or fixed support, compression springs disposed on the tube at each side of and bearing against the collar, the tube serving to support the springs against buckling under load, and adjustable nuts threaded on the two ends of the tube for adjusting the initial compression of said springs individually whereby the anchorage may exert an initial thrust upon the pipe in either direction desired as well as a resistance to movement in both directions.

3. The combination with a steam supply system including horizontal runs of pipe subjected to longitudinal vibration, of an anchorage adapted to be secured to one of said runs and to a fixed support, said anchorage comprising two compression springs disposed end to end, an abutment between the adjacent ends of the springs and an articulated connection between such abutment and either the fixed support or the pipe, a member disposed longitudinally of the springs and having individually adjustable spring-compressing elements engaging the opposite ends of the springs and an articulated connection between such longitudinally extending member and the other of the pipe or fixed support, the parts being so constructed and arranged that the initial compression of said springs may be individually adjusted so that the anchorage may exert an initial thrust upon the pipe in either direction desired as well as a resistance to movement in both directions.

EDWIN A. WERT.